Figure 1:
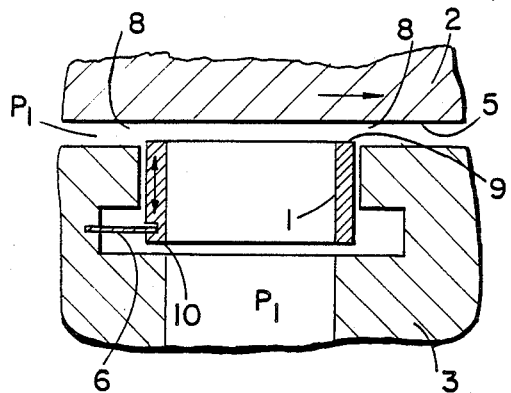
Figure 2:
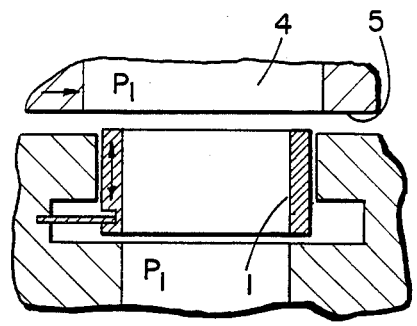

United States Patent [19]

Wankel

[11] Patent Number: 4,783,083
[45] Date of Patent: Nov. 8, 1988

[54] FLUID PRESSURE OPERATED SEALING PROCESS AND SEALING MEANS

[76] Inventor: Felix Wankel, Fraunhoferstrasse 10, D-8990 Lindau, Fed. Rep. of Germany

[21] Appl. No.: 73,957

[22] Filed: Jul. 15, 1987

[30] Foreign Application Priority Data

Aug. 1, 1986 [DE] Fed. Rep. of Germany ....... 3626157

[51] Int. Cl.⁴ ............................................. F16J 15/46
[52] U.S. Cl. .......................................... 277/1; 277/3; 277/DIG. 7
[58] Field of Search ...................... 277/1, 3, 27, 212 F, 277/237 R, DIG. 7

[56] References Cited

U.S. PATENT DOCUMENTS

| | | | |
|---|---|---|---|
| 3,273,899 | 9/1966 | Warnery | 277/3 |
| 3,694,894 | 10/1972 | Jelinek et al. | 277/1 X |
| 3,729,030 | 4/1973 | Brissenden | 277/1 X |
| 4,065,137 | 12/1977 | Rueggeberg et al. | 277/DIG. 7 X |
| 4,498,678 | 2/1985 | Vestergaard | 277/3 |

FOREIGN PATENT DOCUMENTS 2097490 11/1982 United Kingdom ................... 277/3

Primary Examiner—Robert S. Ward
Attorney, Agent, or Firm—Ladas & Parry

[57] ABSTRACT

To avoid friction losses or the striking of a sealing part (1) against the edge of a sealing surface interruption, the movement of the sealing part (1) into and out of contact with the sealing surface is controlled by the medium to be sealed, so that there is a sealing contact only at that moment in which there is an overpressure in the area to be sealed. This control takes place through the vacuum produced in the sealing gap (8) during the brief flow therethrough and the relative overpressure with respect thereto on the opposite side (10) of the sealing part (1). In the differential pressure-less state, the sealing part is e.g. held by a spring (6) at a distance from sealing surface (5).

2 Claims, 1 Drawing Sheet

FLUID PRESSURE OPERATED SEALING PROCESS AND SEALING MEANS

BACKGROUND OF THE INVENTION

The present invention relates to a process for bringing about sealing between machine parts moveable relative to one another by means of a sealing part moveably held in one of the machine parts at alternating pressures.

For sealing along uninterrupted sealing surfaces, e.g. on the cylindrical surface of a reciprocating piston machine or the inner surface of the casing of a rotary piston machine, in known processes of this type the sealing part is permanently pressed against the sealing surface by spring tension, although in the case of machines with pressures of the medium to be sealed which change down to vacuum level, a permanent, complete approximation of the sealing part or a contact pressure is not necessary. The pressure of the sealing part leads to friction losses and the stripping of lubricating fluid from the sealing surface.

For bringing about sealing by means of sealing or packing strips on rotary piston machines with uninterrupted sealing surfaces, it has already been proposed to mount the sealing strips in their centre of gravity. However, as they are pressed against the sealing surface, they move outwards somewhat at the interruptions of said surface, so that when again in contact with a sealing surface mechanical stresses occur or a complicated mechanical control of the sealing strips is necessary (U.S. Pat. No. 4,296,936).

SUMMARY OF THE INVENTION

The object of the present invention is to provide a process of the aforementioned type which, in simple manner, it is possible to control the movement of a sealing part between a position raised from the sealing surface and an engagement position on the latter at the instant of producing a significant overpressure in the space or area to be sealed. This problem is solved in that the moveable sealing part is kept raised from the facing sealing surface with a limited force in the differential pressure-less state and the application of the sealing part to the sealing surface takes place by a pressure reduction acting on the contact side of the sealing part during the brief flow through the sealing gap and the unreduced pressure from the area to be sealed or the atmosphere. A sealing means for performing the inventive process correspondingly has a device, e.g. a spring, magnetic or hydraulic means and the like for raising and retaining the sealing part with a limited force at a limited distance from the sealing surface facing the sealing part. However, retaining and raising can be brought about solely by the effect of gravity, so that no special or separate means are absolutely necessary for this purpose.

DESCRIPTION OF THE DRAWING AND PREFERRED EMBODIMENTS

The invention is described in greater detail hereinafter relative to non-limitative embodiments and the diagrammatic drawings. The latter constitute cross-sections in the vicinity of a sealing part 1 of the two machine parts 2 and 3 moved relative to one another. FIGS. 1-5 show successive motion or movement phases of a sealing arrangement. Machine part 2 e.g. corresponds to the rotary slide valve of a rotary slide valve control means of an internal combustion engine, so that with a constant spacing it moves at right angles to the fixed machine part 3, which thus corresponds to the cylinder head of the machine. In the position according to FIG. 2 the control opening or port 4 directly faces the ring gasket 1 held moveably, i.e. displaceably in machine part 3.

According to the prior art, with constant pressing of the ring gasket against sealing surface 5, it would be necessary to make port 4 smaller than gasket 1, so that the latter were not inserted into the port. However, according to the invention, in the differential pressure-less state corresponding to FIGS. 1 and 2, ring gasket 1 is held at a limited distance from sealing surface 5 by leaf springs 6.

Figure 3:
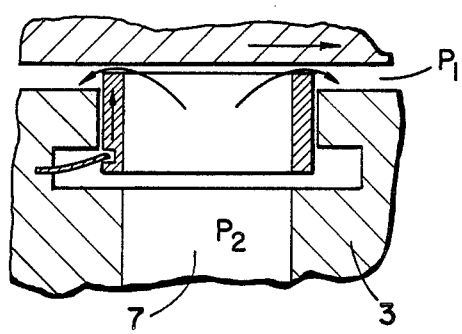
Figure 4:
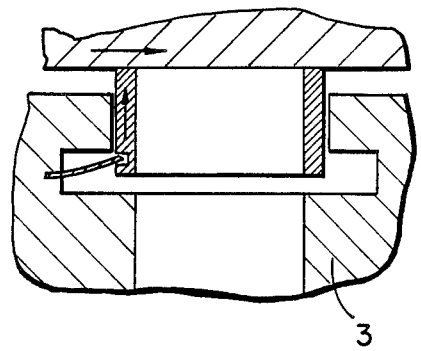
Figure 5:
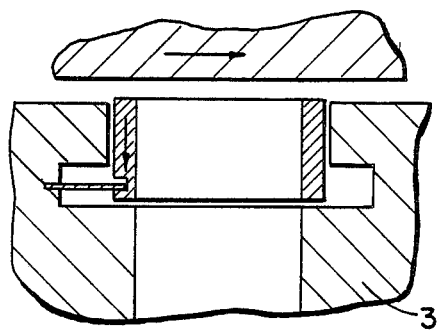

The sudden pressure rise in the channel 7 to be sealed from $p_1$ to $p_2$, the medium to be sealed, e.g. combustion gas, briefly flows out through the annular clearance 8 between the running sealing surface 9 of ring gasket 1 and sealing surface 5, so that in said clearance a vacuum is produced on the basis of the Bernoulli Flow Law and there is simultaneously an overpressure $p_2$ at the thrust side 10 of gasket 1, as shown in FIG. 3. The resulting force presses the gasket 1 rapidly into the sealing position against sealing surface 5 and as shown in FIG. 4. FIG. 5 shows the return of gasket 1 to its raised position.

Tests on a motor-fired test apparatus have revealed that the gas quantity flowing out through clearance 8 is negligible or hardly noticeable. When the gas pressure drops, the ring gasket 1 returns to its initial position according to FIGS. 5 or 1 as a result of the tension of spring 6.

It is obvious that on the basis of the inventive process, numerous sealing means can be designed as a function of the set problem. For the most frequent application cases, the inflow of the medium to be sealed takes place along the sealing surface 5, such as e.g. in the case of a piston ring seal or the sealing strip or strap of a rotary piston machine. In the case of a piston ring seal, it is possible to e.g. obviate a need for an additional spring element for keeping the ring gasket or piston ring away from the cylinder working surface, in that said ring is constructed with a correspondingly smaller diameter and is made elastically expandable by the gas pressure.

It is obvious that the width of the sealing gap 8 left when the sealing part is raised in the diagrammatic representations of FIGS. 1-5 is not to scale and can in fact be very small, because it is merely necessary to avoid friction contact or a butting against interruption edges of the sealing surface 5 facing sealing part 1.

What is claimed is:

1. A process for bringing about a seal between two machine parts (2,3) moveable relative to one another by means of a sealing part moveably held in one of the machine parts, in the case of changing pressures, wherein the moveable sealing part (1) is kept raised from the facing sealing surface (5) with a limited force in the differential pressure-less state and the application of sealing part (1) to sealing surface (5) takes place by a pressure reduction acting on the contact side (9) of sealing part (1) when there is a brief flow through sealing gap (8) and the unreduced pressure from the area to be sealed or the atmosphere on the thrust side (10) of sealing part (1).

2. A sealing means between machine parts moveable relative to one another, with a sealing part (1) moveably held in one of the machine parts (3), for performing the process according to claim 1, wherein there is a device (6) for maintaining sealing part (1) with a limited force at a distance from a sealing surface (5) of the other machine part (2) facing sealing part (1), so that the sealing part temporarily engages on sealing surface (5) due to the pressure reduction on one side (9) of sealing part (1) occuring during the brief outflow through sealing gap (8) and the pressure from the area to be sealed or the atmosphere acting on the opposite side (10).

* * * * *